July 1, 1941.  C. F. TERHUNE  2,247,929
WINDMILL
Filed Aug. 19, 1939  3 Sheets-Sheet 1
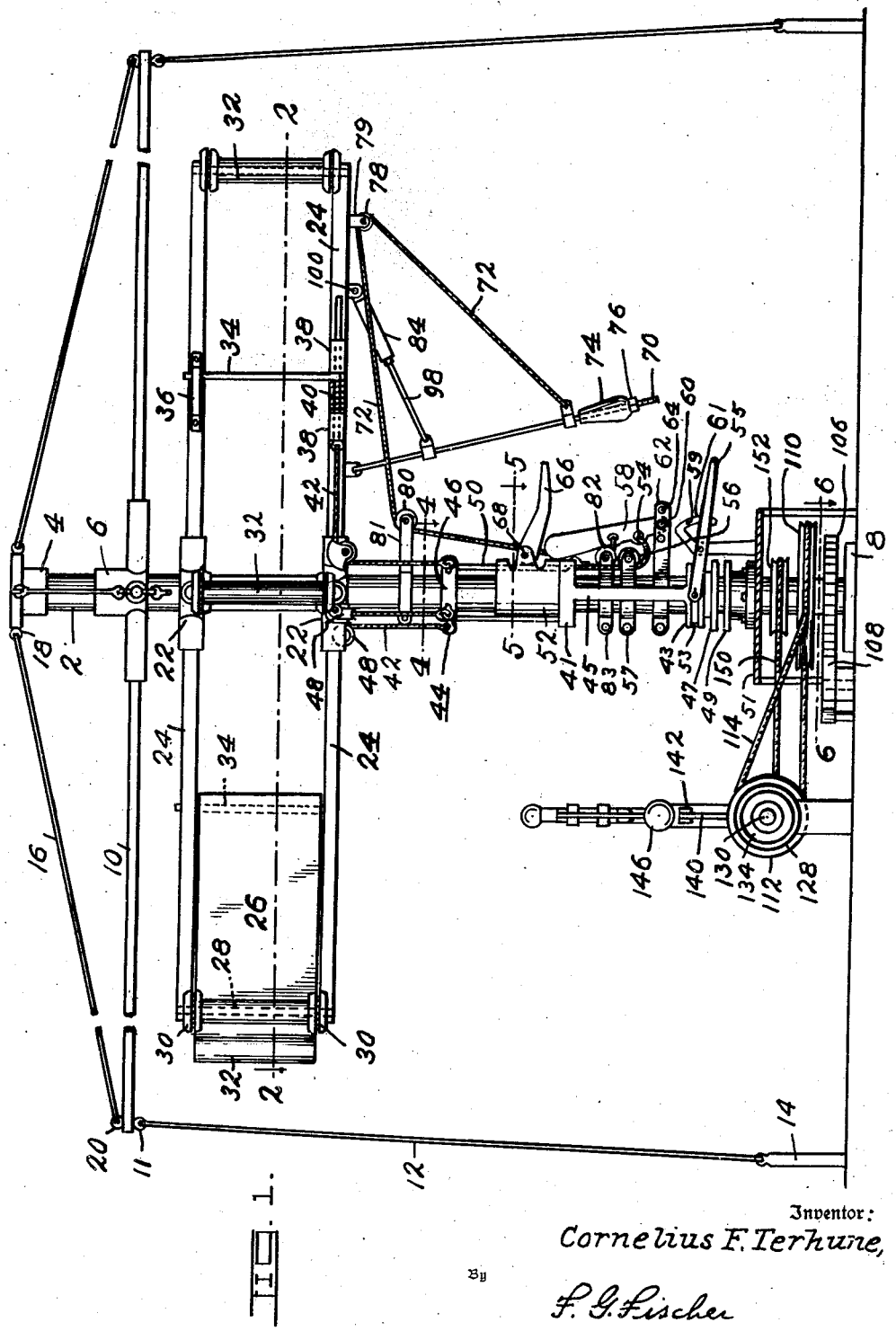
Inventor:
Cornelius F. Terhune,
By
F. G. Fischer
Attorney.

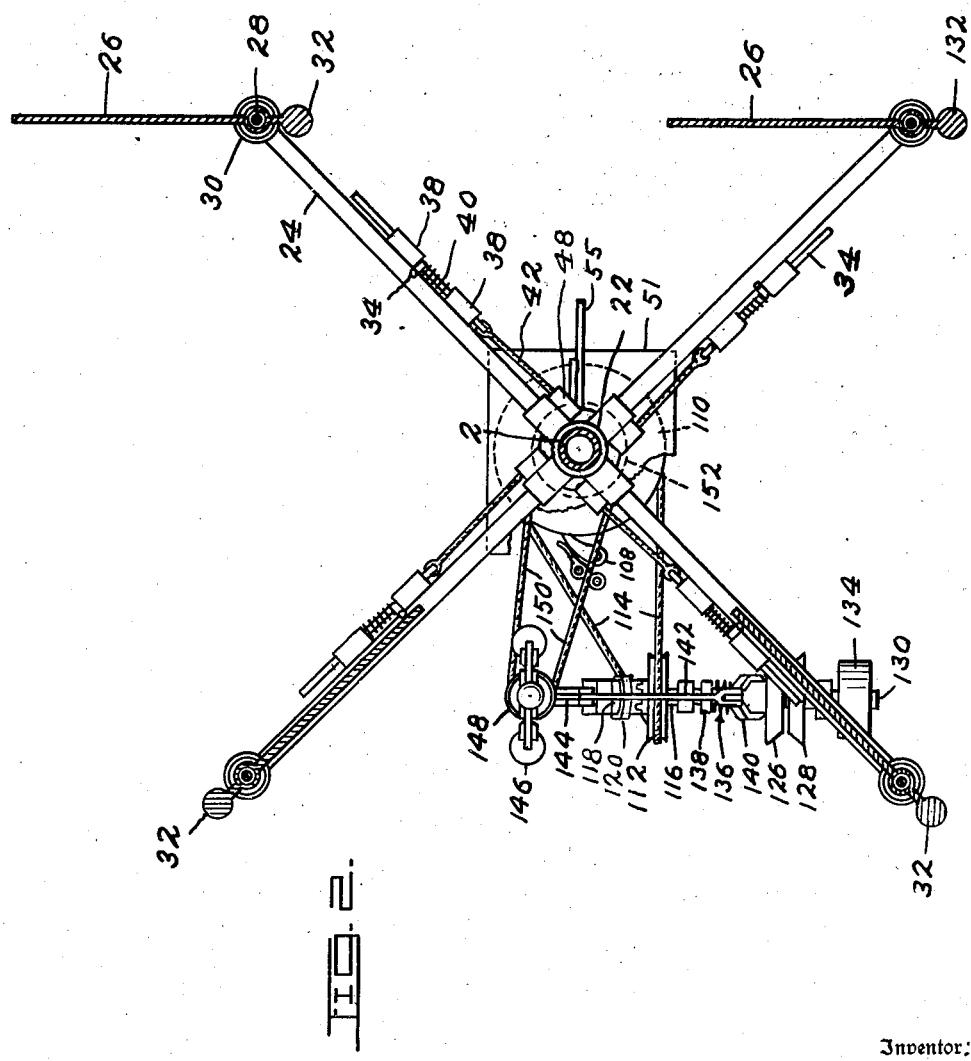

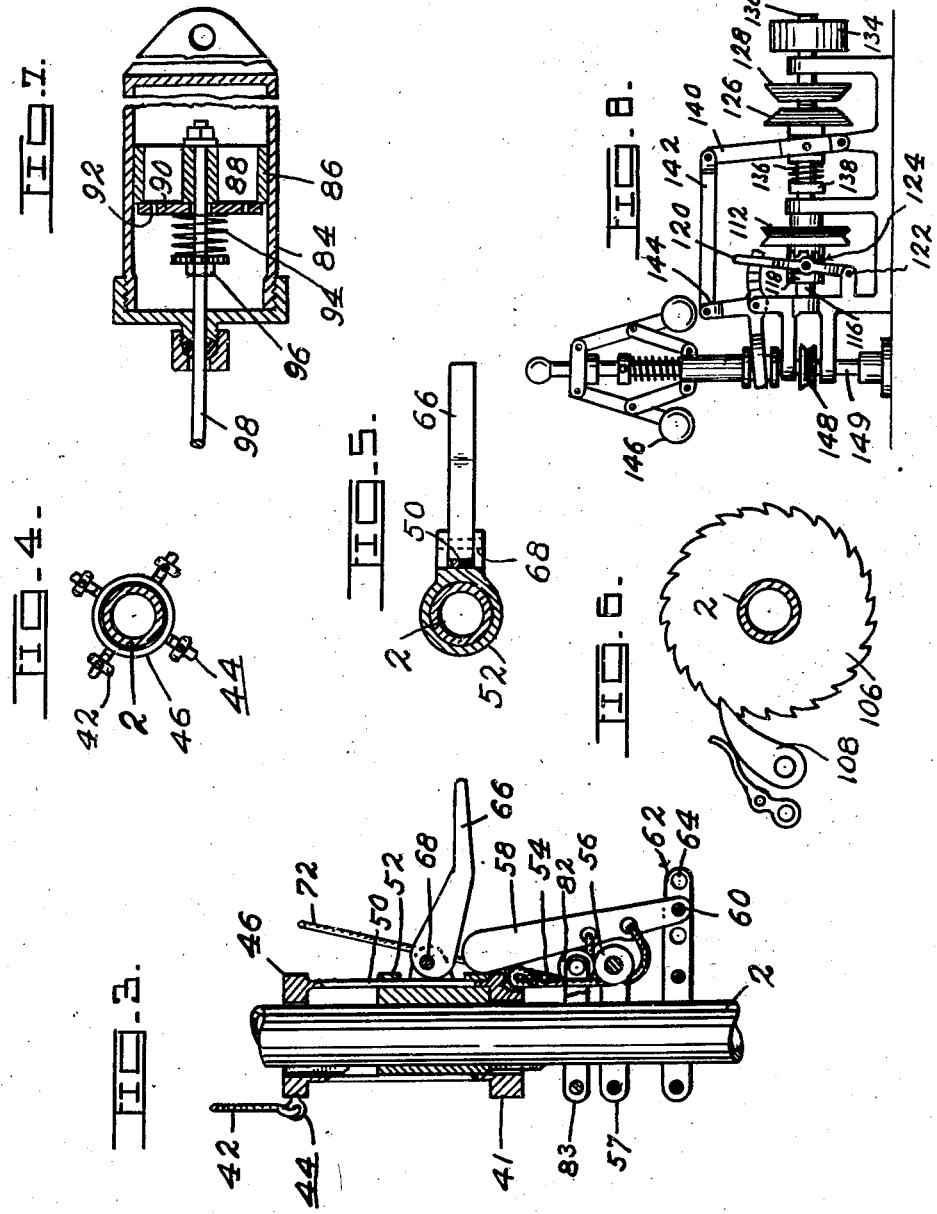

Patented July 1, 1941

2,247,929

UNITED STATES PATENT OFFICE 2,247,929

WINDMILL

Cornelius F. Terhune, Kansas City, Mo.

Application August 19, 1939, Serial No. 291,060

8 Claims. (Cl. 170—26)

My invention relates to windmills and one object of the invention is to provide a mill of this character having vanes pivotally mounted between radial arms which rotate about a vertical axis in such manner that the vanes present their broad sides to the wind when traveling therewith and their edges to the wind when traveling against the same, so that the back pressure upon the vanes is reduced to a minimum and the maximum force of the wind may be utilized for driving the mill.

A further object of the invention is to arrange the parts in such manner that the vanes will normally operate as above stated, but in order that the mill may be stopped when desired manual means are provided for applying a brake and shifting stops from the paths of the vanes to allow all of the latter to present their edges to the wind.

Another object is to provide automatic means for shifting the stops from the paths of the vanes before the velocity of the wind becomes so great as to endanger the mill, and when the velocity of the wind reduces said automatic means shifts the stops back into the paths of the respective vanes so that the mill may start up automatically.

Other objects will hereinafter appear and in order that the invention may be fully understood reference will now be had to the accompanying drawings, in which:

Fig. 1 is a side elevation of the windmill.

Fig. 2 is a horizontal section on line 2—2 of Fig. 1 with the wind-wheel turned approximately 45 degrees from the position shown by Fig. 1.

Fig. 3 is a broken view of the main shaft with some of the associated parts.

Fig. 4 is a horizontal section of the main shaft on line 4—4 of Fig. 1.

Fig. 5 is a horizontal section of the main shaft and a guide fixed thereon, taken on line 5—5 of Fig. 1.

Fig. 6 is a horizontal section of the main shaft on line 6—6 of Fig. 1.

Fig. 7 is an enlarged broken sectional view of a hydraulic retarding device.

Fig. 8 is an elevation of part of the power transmission mechanism.

In carrying out my invention I provide a rotatable vertical shaft 2 journaled at its upper portion in bearings 4 and 6 and at its lower end in a bearing 8. The bearing 6 is held in fixed position with a plurality of radial rods 10 extending therefrom and provided at their outer ends with eyes 11 to which the upper ends of the tie-rods 12 are fixed. The lower ends of the tie-rods are attached to posts 14 fixed at their lower ends in the ground. The bearing 4 is held in fixed position with stay-wires 16 secured at their ends to eyes 18 and 20 projecting from the bearing 4 and the outer ends of the respective rods 10.

The frame of the mill wheel comprises a pair of hubs 22 and any desired number of arms 24 fixed to and extending radially from the respective hubs. The hubs 22 are spaced apart and fixed to shaft 2, and the arms 24 are horizontally disposed and one of each pair is spaced above the other to freely admit a respective vane 26 mounted near one end upon a rod 28, one of which unites the outer ends of each pair of arms 24. The vanes 26 consist preferably of sheet metal, but other suitable material may be employed. Ball bearings 30 are associated with the rods 28 and interposed between each pair of arms 24 and the associated vanes 26, each of which latter is provided at its end nearest to the rod 28 with a counter weight 32 to balance the weight of the vane upon the associated ball bearings 30. The weight 32 is arranged diametrically opposite the vanes 26 to steady the same when the wind is erratic and frequently changes its course.

The flat sides of the vanes 26 are normally held with stops 34 broadside to the wind at that side of the wheel which is turning with the wind. Each stop 34 is preferably of inverted T-form, the vertical member of which is slidably mounted at its upper end in a guide 36, fixed to the upper associated arm 24, and the horizontal member of which is slidably mounted in guides 38 fixed to the associated lower arm 24. Each stop 34 is normally held in the path of the associated vane 26 with a coil spring 40 loosely mounted on the horizontal portion of the stop and interposed between one of the guides 38 and the vertical member of the stop.

Cables 42 are provided for simultaneously pulling the stops 34 out of the path of the respective vanes 26 when the speed of the wind becomes excessive. Each cable 42 is attached at its upper end to the horizontal member of the associated stop 34 and attached at its lower end to an eye 44 projecting from a ring 46 splined upon the shaft 2 to rotate therewith and at the same time move vertically thereon. The cables 42 are guided to the respective eyes 44 with hooded sheaves 48, the hooded portions of which are fixed to the lower hub 22.

The ring 46 is fixed to the upper end of a vertically movable slide 50 which operates in a guide member 52 fixed to the main shaft 2. The lower end of slide 50 is fixed to the upper end of a vertically movable member comprising upper and lower rings 41 and 43, respectively, united by one or more vertical bars 45. The rings 41 and 43 are splined upon shaft 2 so that they may slide vertically thereon and rotate therewith. The lower ring 43 has a rotatable brake wheel 47 fixed thereto for frictional engagement with a stationary brake-wheel 49 fixed upon a support 51. A band 53 is freely mounted upon the lower ring 43 and pivotally connected to a hand lever 55 which, when pulled upward, simultaneously applies the brake and through the medium of the intervening parts above described pulls the stops 34 out of the paths of the vanes 26. Ordinarily the hand lever 55 is free to move up or down so it will not interfere with the automatic operation of the stops 34 as hereinafter described, but when desired it may be secured in raised position with suitable means such as a pin (not shown) adapted to be placed beneath the lever and inserted in a hole 59 of a sector 61.

A cable 54 attached to the ring 41, extends beneath a guide sheave 56 and is attached at its lower end to a weight 58 adapted to be swung downward and outward by centrifugal force and through the medium of slide 50 and cables 42 automatically move the stops 34 out of the paths of vanes 26 when the speed of the wind becomes excessive. The guide sheave 56 is mounted in a bracket 57 clamped upon the shaft 2 and the weight 58 is mounted at its lower end upon a pivot 60 carried by a bracket 62 which is clamped upon the main shaft 2 to rotate therewith. The bracket 62 has a series of apertures 64 so that the pivot 60 may be moved inward or outward to vary the inclination of the weight 58 when the same is in raised position as shown by Fig. 1, it being understood that the greater the inclination the faster the mill wheel must revolve to swing the weight 58 outward by centrifugal force.

When the weight 58 is swung downward and outward from its raised position by centrifugal force it pulls slide 50 down therewith and the slide is automatically held in lowered position with a clamping member 66, so that the springs 40 can not push the stops 34 into the paths of the vanes until the slide 50 is released. The clamping member 66 is connected by a pivot 68 to the guide member 52 and is held by the force of gravity against the slide 50 and in turn holds the latter in frictional contact with the guide 52 against the action of the springs 40.

When the wind subsides the weight 58 is swung to its raised position shown by Fig. 1 with an oscillatory lever 70 and a cable 72. The oscillatory lever 70 is pivotally connected at its upper end to one of the lower arms 24 and provided at its lower portion with a counterweight 74 which may be adjusted up or down on the lever 70 to accelerate or retard the pivotal action thereof. The counterweight 74 is held at any point of its adjustment with a nut 76 threaded upon the lever 70. The cable 72 is attached at one end to the lower portion of the lever 70 and at its opposite end to the weight 58 to which it is guided by sheaves 78, 80 and 82. Guide sheave 78 is mounted in a support 79 fixed to an adjacent arm 24, and sheaves 80 and 82 are mounted in brackets 81 and 83, respectively, clamped upon the shaft 2.

When the weight 58 is swung upward as stated it contacts and lifts the free end of the clamping member 66, thus releasing the slide 50 which is then pulled upward by the action of the springs 40 as they move the stops 34 into the paths of the respective vanes 26.

The oscillatory lever 70 is free to be swung outward quickly by centrifugal force when the speed of the wind becomes excessive, but its inward movement is impeded to a certain extent by a retarding device comprising a cylinder 84 equipped with a reciprocatory piston 86 having a plurality of comparatively large ports 88 extending therethrough and controlled by a valve 90 having relatively small transverse ports 92 to register with the larger ports 88. The valve 90 is yieldably held against the front side of the piston 86 with a coil spring 94 which is interposed between the valve 90 and a nut 96 threaded upon the piston rod 98.

The rear end of the cylinder 84 is connected by a pivot 100 to the arm 24 carrying lever 70, to which latter the outer end of the piston rod 98 is freely connected. Preferably the cylinder 84 is provided with a certain amount of oil or other liquid to cooperate with the small ports 92 in impeding the outward movement of the piston. The foregoing arrangement permits the stops 34 to be quickly drawn out of the paths of the vanes 26 when the speed of the wind becomes excessive and prevents them from moving into the paths of the vanes until the wind subsides as it is apparent that when the piston 86 is moved to the right, Fig. 7, the liquid in the cylinder will pass freely through the ports 88 and push the valve 90 open so that lever 70 may quickly swing outward in response to centrifugal force and slacken cable 72 so that weight 58 will be free to also respond to centrifugal force, but the inward movement of lever 70 will be retarded by the valve 90 closing against the piston so that the liquid in the cylinder will have to pass through the small ports 92.

In the event that the direction of the wind should become quickly reversed the mill wheel and the shaft 2 are prevented from rotating in a counterclockwise direction by means of a ratchet wheel 106, fixed upon the lower portion of the shaft 2, and a spring pressed pawl 108 engaging said ratchet wheel.

Power may be transmitted from the mill by any suitable power transmitting mechanism. In the present instance I have shown such mechanism in the form of a large pulley 110 fixed upon the lower portion of the shaft 2 and arranged to drive a pulley 112 through the medium of a belt 114. The pulley 112 is loosely mounted upon a countershaft 116 which it is adapted to drive through a toothed clutch 118 slidably mounted and splined upon said shaft 116. The clutch 118 may be manually shifted in or out of engagement with the toothed hub of the pulley 112 through the medium of a hand lever 120 mounted at its lower end upon a pivot 122 and pivotally connected at its intermediate portion to a sleeve 124 loosely embracing the hub of the clutch 118.

The countershaft 116 is equipped with a friction wheel 126 adapted to drive a companion friction wheel 128 fixed upon a counter shaft 130 provided with a fixed pulley 134 which, through the medium of a belt, not shown, may be utilized for operating a pump or driving numerous kinds of light machinery. The friction wheel 126 is splined and slidably mounted upon the countershaft 116 so that it may be shifted into frictional engagement with the companion friction wheel 128 through the medium of a spring 136 interposed between the hub of said friction wheel 126 and a collar 138 fixed upon the shaft 116. When the speed of the mill wheel attains a certain rate the friction wheel 126 is automatically shifted into engagement with the companion wheel 128 through the medium of a lever 140, a connecting rod 142, a bell-crank 144, a ball governor 146 and a pulley 148 mounted upon the shaft of the ball governor 146 and driven through a belt 150 from a pulley 152 fixed upon the shaft 2. When the speed of the wind drops below a predetermined rate the friction wheel 126 is shifted out of engagement with the friction wheel 128 by the governor 146 through the lever 140, connecting rod 142 and the bell-crank 144, thereby relieving the mill wheel of the load driven by pulley 134, so that the mill wheel will be free to quickly respond to an increase in the speed of the wind.

The operation briefly stated is as follows: Assuming that the parts are in the position shown by Fig. 1, the mill wheel will be driven in a clockwise direction and the stops 34 will be held in active position with the springs 40 so that those vanes 26 traveling with the wind will be held broadside thereto. Should the speed of the wind become excessive the counterweighted lever 70 will be swung upward and outward by centrifugal force, thereby slackening the cable 72 so that the weight 5 may be swung downward and outward by centrifugal force. As the weight 58 moves downward and outward it will pull the stops 34 out of the paths of the respective vanes 26 through the medium of the cables 42 and the slide 50. When the slide 50 is pulled downward it is automatically held in lowered position by the clamping member 66 which forces the slide 50 into frictional engagement with the guide 52. When the stops 34 are pulled out of the paths of the respective vanes 26 as above stated, the latter are free to present their weighted ends 32 to the wind and thereby reduce the speed of the mill wheel.

When the wind subsides sufficiently to permit the weighted lever 70 to move downward and inward it will pull upon the cable 72 and thus restore the weight 58 to its normal position shown by Fig. 1. As the weight 58 is pulled upward and inward by the cable 72 it impinges against and lifts the free end of the clamping member 66, thus releasing the slide 50 so that the springs 40 will be free to push the stops 34 out into the paths of the vanes 26.

Should the speed of the wind quickly fluctuate from high to low and vice versa the stops 34 will be prevented from intermittently moving in and out of the paths of the vanes 26 by the retarding device, the piston 86 of which is retarded in its outward movement by closure of the valve 90 which will delay the downward and inward movement of the lever 70 until the speed of the wind becomes normal.

From the foregoing description it is apparent that I have provided a windmill possessing the advantages above pointed out, and while I have shown and described the preferred embodiment of the invention I reserve the right to make such changes and modifications thereof as properly fall within the spirit and scope of the invention as claimed.

Having thus described my invention, what I claim and desire to secure by Letters Patent, is:

1. In a windmill, a vertical rotatable shaft, vane supporting means associated with said shaft and rotatable therewith, vanes pivoted to said supporting means, movable stops on the supporting means for holding the respective vanes broadside to the wind, means for urging said stops into the path of the respective vanes, cables for pulling the stops out of the path of the respective vanes, a slide associated with the shaft and adapted to move downward to active position and operate the cables, clamping means for holding said slide in active position, and means rotatable with the shaft and operated by centrifugal force including a vertically movable member which on its downward movement moves the slide downward and on its upward movement disengages the clamping means from said slide so the latter may move upward to idle position.

2. In a windmill, a vertical rotatable shaft, vane supporting means associated with said shaft and rotatable therewith, vanes pivoted to said supporting means, movable stops on the supporting means for holding the respective vanes broadside to the wind, springs for urging said stops into the path of the respective vanes, means for moving the stops out of the path of the respective vanes, a slide associated with the shaft and adapted to move downward to active position and operate the last mentioned means, clamping means for holding said slide in active position, and means rotatable with the shaft and operated by centrifugal force including a vertically movable member which on its downward movement moves the slide downward and on its upward movement disengages the clamping means from said slide so the latter may move upward to idle position.

3. In a windmill, a vertical rotatable shaft, vane supporting means associated with said shaft and rotatable therewith, vanes pivoted to said supporting means, movable stops on the supporting means for holding the respective vanes broadside to the wind, springs for urging said stops into the path of the respective vanes, means for moving the stops out of the path of the respective vanes, a slide associated with the shaft and adapted to move downward to active position and operate the last mentioned means, clamping means for holding said slide in active position, a weight pivotally associated with the shaft and adapted to be swung downward to active position by centrifugal force or pulled upward to idle position, means connecting said weight and the slide so they will move together, oscillatory means rotatable with the vane supporting means and adapted to be swung upward by centrifugal force, and a cable connecting said oscillatory means to the weight for pulling the same upward when the oscillatory means moves downward.

4. In a windmill, a vertical rotatable shaft, vane supporting means associated with said shaft and rotatable therewith, vanes pivoted to said supporting means, movable stops on the supporting means for holding the respective vanes broadside to the wind, means for urging said stops into the path of the respective vanes, flexible means for pulling the stops into the path of the respective vanes, a vertically movable slide associated with the shaft adapted to move downward to active position and operate said flexible means, a weight pivotally associated with the shaft and adapted to be swung outward from a raised position by centrifugal force, a cable whereby said weight pulls the slide downward as the weight moves outward, a weighted lever pivotally connected at its upper end to the vane supporting means and adapted to be swung upward and outward by centrifugal force, flexible means whereby said weighted lever pulls the weight to raised position as the weighted lever moves downward, and means connecting the vane supporting means and the weighted lever for retarding the downward movement of the latter.

5. In a windmill, a vertical rotatable shaft, vane supporting means associated with said shaft and rotatable therewith, vanes pivoted to said supporting means, movable stops on the supporting means for holding the respective vanes broadside to the wind, means for urging said stops into the path of the respective vanes, a weight pivotally associated with the shaft and adapted to be swung outward from a raised position by centrifugal force, means actuated on the outward movement of said weight for moving the stops out of the path of the respective vanes, and means controlled by centrifugal force for swinging the weight upward to raised position.

6. In a windmill, a vertical rotatable shaft, vane supporting means associated with said shaft and rotatable therewith, vanes pivoted to said supporting means, movable stops on the supporting means for holding the respective vanes broadside to the wind, means for urging said stops into the path of the respective vanes, a weight pivotally associated with the shaft and adapted to be swung outward from a raised position by centrifugal force, means actuated on the outward movement of said weight for pulling the stops out of the path of the respective vanes, pivoted means associated with the vane supporting means and adapted to be swung outward and upward by centrifugal force, means whereby said pivoted means restores the weight to raised position as the pivoted means moves downward and inward, and means for retarding said pivoted means on its downward and inward movement.

7. In a windmill, a vertical rotatable shaft, vane supporting means associated with said shaft and rotatable therewith, vanes pivoted to said supporting means, movable stops on the supporting means for holding the respective vanes broadside to the wind, means for urging said stops into the path of the respective vanes, a weight pivotally associated with the shaft and adapted to be swung outward from a raised position by centrifugal force, means actuated on the outward movement of said weight for pulling the stops out of the path of the respective vanes, pivoted means associated with the vane supporting means and adapted to be swung outward and upward by centrifugal force, means whereby said pivoted means restores the weight to raised position as the pivoted means moves downward and inward, a cylinder pivoted at one end to the vane supporting means, a reciprocatory piston head mounted in said cylinder and provided with relatively large ports, a piston rod connected at its inner end to said piston head and at its outer end to the pivoted means, a valve freely mounted upon the piston rod to retard its outward movement, said valve having relatively small ports to register with the large ports, and spring means for urging said valve against the piston head.

8. In a windmill, a vertical rotatable shaft, vane supporting means associated with said shaft and rotatable therewith, vanes pivoted to said supporting means, a movable stop for each vane, means for urging the stops into the path of the respective vanes, cables for moving the stops from the path of the respective vanes, means vertically movable on the shaft and rotatable therewith for operating the cables, a brake wheel fixed to said vertically movable rotatable means, a stationary brake wheel, and manual means for causing said vertically movable rotatable means to operate the cables and also engage the rotatable brake wheel with the stationary brake wheel.

CORNELIUS F. TERHUNE.